United States Patent [19]

Owaki et al.

[11] Patent Number: 4,527,207
[45] Date of Patent: Jul. 2, 1985

[54] TAPE SPEED CONTROL FOR PRODUCING A MASTER TAPE CARRYING A DIGITAL SIGNAL

[75] Inventors: Isao Owaki, Tokyo; Susumu Saito, Sagamihara; Yasuhiko Fujii, Yamato; Shinji Nakamura, Tokyo, all of Japan

[73] Assignee: Victor Company of Japan, Limited, Yokohama, Japan

[21] Appl. No.: 522,697

[22] Filed: Aug. 12, 1983

[30] Foreign Application Priority Data

Aug. 14, 1982 [JP] Japan .................. 57-141292

[51] Int. Cl.³ ............................ G11B 15/52
[52] U.S. Cl. .................................. 360/73
[58] Field of Search .................. 360/15, 73

[56] References Cited

U.S. PATENT DOCUMENTS 3,978,521 8/1976 Langer et al. .................. 360/14

FOREIGN PATENT DOCUMENTS 3039747 5/1982 Fed. Rep. of Germany .
562494 5/1975 Switzerland .

Primary Examiner—George G. Stellar
Attorney, Agent, or Firm—Lowe, King, Price & Becker

[57] ABSTRACT

A digital signal having a configuration of blocks or frames is recorded via a multi-track record on a first group of tracks, such as odd tracks, of a master tape which is driven at a first direction. Then when recording another digital signal by forming a second group of tracks, such as even tracks, in a second direction which is opposite to the first direction, the digital signal prerecorded on the first group of tracks is derived to produce a speed signal indicative of the tape speed at which the digital signal was recorded on the first group. The speed signal is then compared with a reference signal having a predetermined frequency for producing a control signal, which is used to control the driving speed of the master tape. Thus the second group of tracks is formed with the running speed of the master tape being controlled. As a result, the phase difference between the first and second groups of tracks is constant throughout the entire length of the master tape. The speed signal may be derived from a synchronous signal recorded on a control track, which may be formed when forming the first group of tracks.

12 Claims, 7 Drawing Figures

TAPE SPEED CONTROL FOR PRODUCING A MASTER TAPE CARRYING A DIGITAL SIGNAL

BACKGROUND OF THE INVENTION

This invention relates generally to magnetic recording apparatus or method therefor, and particularly, the present invention relates to tape speed control for producing a master tape carrying digital signals, from which master tape the digital signals are copied to a plurality of slave tapes.

When it is intended to produce a plurality of copies of magnetic recording tapes by way of tape-to-tape copy technique, a master tape is first produced and then the contents or information prerecorded in the master tape is reproduced or read out to record the same onto slave tapes one after another. In the case that the information to be copied is an analog signal as in analog audio cassette tapes or open reel tapes, the information can be copied from a master tape to a slave tape at a relatively high speed. Namely, signals respectively recorded in respective tracks are simultaneously read out by means of a multi-track head, and the read out signals are simultaneously recorded on multi-tracks on the slave tape.

However, when it is intended to copy a magnetic recording tape carrying digital signals having a configuration of blocks or frames as PCM (pulse code modulated) signals, tape-to-tape copy cannot simply be effected. In the case that signals on different tracks have been recorded on a master tape in one direction of the tape as in a magnetic recording tape used for computers, the signals may be read out by a multi-track head and then recorded by another multi-track head to produce a copy. However, in the case that some tracks have been recorded in one direction and the remaining tracks have been recorded in an opposite direction in the same manner as in normal music cassette tapes, the phase relationship between one group of tracks and the other group of tracks, both recorded in opposite directions, is not necessarily uniform or constant throughout the entire length of the magnetic recording tape due to the variation in tape speed on recording.

As is well known, digital signals derived from a master tape have to be processed prior to recording the same on slave tape or tapes in order to correct possible errors due to jitter, skew, dropout or the like. When processing the digital signal read out from the master tape, a synchronous signal indicative of the position of data on the master tape is required. Such a synchronous signal may be derived from a control track, in which a predetermined synchronous or timing signal is prerecorded, or from one of data tracks in the case that the digital signal has a block or frame configuration.

However, when digital signals are recorded on a plurality of tracks of two groups in two directions as described in the above, a derived synchronous signal represents the position of data of only one of the two groups. Therefore, although a synchronous signal derived from a track of one group can be simply used for processing read out data from tracks of this group, it cannot be simply used for processing data read out from a track of the other group because of the phase difference between signals of the two groups of tracks. Namely, if it is intended to effect tape-to-tape copying by using a master tape on which bits of a digital word are recorded on multitracks in two directions, a complex timing control device would be needed for compensating for the phase difference between two groups of tracks so that read out data are correctly stored in appropriate memories from which data will be read out in synchronism with clock pulses to be recorded on a slave tape. Furthermore, such a possible technique requires a large capacity of the memories.

For these reasons, in conventional techniques digital data having a configuration of blocks or frames prerecorded on a master tape in two directions had to be reproduced in two directions separately one after another.

SUMMARY OF THE INVENTION

An object of the present invention is to provide a new and useful apparatus and method for producing a master tape so that digital signals can be recorded on two groups of tracks in opposite directions, where the phase relationship between the two groups of tracks is constant throughout the entire length of the master tape, allowing the master tape to be copied with a memory of a small capacity by deriving data from all the tracks simultaneously for producing slave tape or tapes with high productivity.

According to a feature of the present invention one group of tracks is formed on a master tape first by scanning the master tape in one direction with a multi-track head, and then another group of tracks is formed thereon by scanning the master tape with the multi-track head in an opposite direction with a tape drive mechanism being controlled on the basis of a signal indicative of the tape speed at which data have been recorded on the first-mentioned group of tracks.

In accordance with the present invention there is provided apparatus for producing a master tape, comprising: tape driving means for driving the master tape; a multi-track magnetic head and an associated circuit for recording a digital signal on the master tape such that first and second groups of a plurality of tracks are respectively formed when the multi-track magnetic head scans the master tape in first and second directions; a magnetic head for deriving a signal from one of the first group of tracks; means responsive to the signal from the magnetic head for producing a speed signal indicative of the tape speed at which the digital signal was recorded on the first group tracks in the first direction; means for producing a control signal by comparing the phase between the speed signal and a reference signal having a predetermined frequency; and means for controlling the speed of the master tape by controlling the means for driving the master tape, by using the result of the comparison, when forming the second group tracks.

In accordance with the present invention, there is also provided apparatus for producing a master tape, comprising: tape driving means for driving the master tape; a multi-track magnetic head and an associated circuit for recording a digital signal on the master tape such that first and second groups of a plurality of tracks are respectively formed when the multi-track magnetic head scans the master tape in first and second directions; means for forming a control track when forming the first group tracks by recording a predetermined synchronous signal; a magnetic head for deriving the synchronous signal from the control track when forming the second group tracks; means responsive to the synchronous signal from the magnetic head for producing a speed signal indicative of the tape speed at which the digital signal was recorded on the first group of tracks in the first direction; means for producing a control signal by comparing the phase between the speed signal and a reference signal having a predetermined frequency; and means for controlling the speed of the master tape by controlling the means for driving the master tape, by using the result of the comparison, when forming the second group tracks.

In accordance with the present invention there is further provided a method for producing a master tape, comprising the steps of: recording a digital signal on the master tape by making a first group of a plurality of tracks; deriving a signal from one of the first group tracks for producing a signal indicative of the speed of the master tape at which the digital signal was recorded on the first group tracks; producing a control signal by using the signal indicative of the speed and a signal having a predetermined frequency; controlling the tape driving speed on the basis of the control signal; and recording another digital signal on the master tape by making a second group of a plurality of tracks by driving the master tape in a direction opposite to that used for making the first group tracks, with the tape speed being controlled.

In accordance with the present invention there is further provided a method for producing a master tape, comprising the steps of: recording a digital signal and a synchronous signal on the master tape by making a first group of a plurality of tracks for the digital signal and a control track for the synchronous signal; deriving the synchronous signal from the control track for producing a signal indicative of the speed of the master tape at which the digital signal was recorded on the first group of tracks; producing a control signal by using the signal indicative of the speed and a signal having a predetermined frequency; controlling the tape driving speed on the basis of the control signal; and recording another digial signal on the master tape by making a second group of a plurality of tracks by driving the master tape in a direction opposite to that used for making the first group tracks, with the tape speed being controlled.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated with like reference numerals throughout the drawings.

DETAILED DESCRIPTION OF THE INVENTION

Prior to describing the preferred embodiments of the present invention, a conventional technique will be described for a better understanding of the present invention. In the case that a digital signal, which has a configuration of blocks or frames such as a PCM signal, is to be recorded on a magnetic recording tape, each data word of the digital signal is recorded by way of a multi-track head so as to form a plurality of parallel tracks on the magnetic tape. Once such a digital signal is recorded on a magnetic tape, there arises a problem caused from jitter, skew and/or burst error. Therefore, when reading out a digital signal from a magnetic tape, the read out signals are processed to compensate for jitter, skew and/or burst error. To this end read out data are temporarily stored in one or more memories by using a timing or synchronous signal which is also read out from the tape.

Furthermore, in order to accurately pick up data from the tape, the running speed of the tape is controlled by using a synchronous signal also derived from one of the data tracks or a control track.

Figure 1:
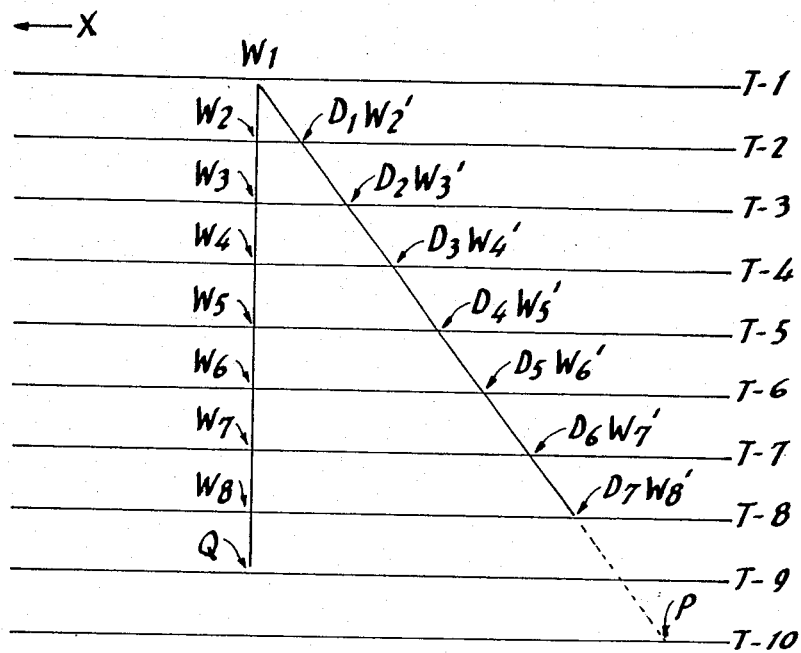
FIG. 1 is a schematic diagram of a digital signal pattern recorded on a magnetic recording tape.

FIG. 1 is an example of a digital signal pattern recorded on a magnetic recording tape. This example shows a signal pattern recorded by using an interleave technique. In order to reduce the frequency of error occurrence on reproduction a P correction line is provided with respect to a Q correction line so that read out data are stored in a memory once and then read out therefrom at a predetermined order to deinterleave the data.

In FIG. 1 plurality of tracks T-1, T-2 . . . T-10 are formed on the magnetic tape, the Q correction line is indicated by points $W_1, W_2 \ldots W_8, Q$, while the P correction line is indicated by points $W_1, D_1W_2', D_2W_3' \ldots D_7W_8'$. The tape runs in a direction indicated by an arrow X. The bits on the P and Q correction lines respectively constitute error correction words P and Q which are expressed by:

$$P = W_1 \oplus D_1 W_2' \oplus \ldots \oplus D_n W_i'$$

$$Q = W_1 \oplus W_2 \oplus \ldots \oplus W_i$$

wherein $\oplus$ indicates modulo 2 addition; n and i are positive integers.

When it is intended to produce magnetic tape copies from a master tape, on which a digital signal having a configuration of blocks or frames has been recorded in two directions, by deriving the prerecorded data of all data tracks simultaneously and then by recording the derived data on a slave tape, the derived or reproduced data has to be processed prior to recording on the slave tape for correcting possible errors. Especially when the master tape is driven at a high speed, error is apt to occur due to dropout or the like. Such error correction is effected by a known reproduce processor by using a synchronous signal also derived from the master tape.

Figure 2:
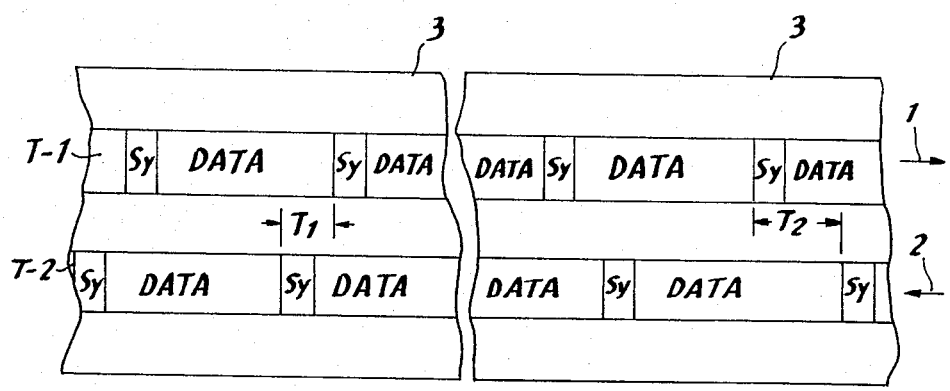
FIG. 2 is a schematic diagram of two tracks on a master tape, which tracks were made by scanning the master tape in opposite directions by using conventional tape driving control.

FIG. 2 is a schematic diagram of the spatial position of signals recorded on two tracks of a master tape 3.

Although ten or more tracks are actually formed, only two tracks T-1 and T-2 are shown for simplicity. Let us assume that an upper track T-1 was formed by driving the master tape 3 from left to right, as indicated by arrow 1, and a lower track T-2 was formed by driving tape 3 in an opposite direction, from right to left, as indicated by arrow 2. Since the digital signal recorded on the master tape 3 has a block or frame configuration as shown, each data block DATA is accompanied by synchronous signal data Sy so that the synchronous signal and the data block appear alternately.

As described at the beginning of the specification, since the tape running speed cannot be maintained exactly constant throughout the entire length of the tape 3, the length of each block on the master tape 3 changes from the beginning of the tape to the end of the tape in a single track. For this reason the phase difference between the tracks T-1 and T-2 is not uniform throughout the entire length of the master tape 3. The master tape 3 shown at the right of FIG. 3 corresponds to one end thereof, while the master tape 3 shown at the left corresponds to the other end. Due to the minute difference in tape running speed from one end to the other end of the tape, a phase difference or time difference $T_1$ between the two tracks T-1 and T-2 at one point of the tape 3 differs from another phase or time difference $T_2$ at a point relatively far from the first-mentioned point in a longitudinal direction of the master tape 3.

Let us suppose that the data of the upper and lower tracks T-1 and T-2 are simultaneously derived by a multi-track head for copying it to a slave tape. If a synchronous signal is derived from the upper track T-1, this synchronous signal is used to control the tape running speed and to correct errors of data from both tracks T-1 and T-2. Although data from the upper track T-1 can be simply stored in a memory by using the synchronous signal because the synchronous signal has been derived from the upper track T-1, the other data from the lower track T-2 cannot be simply stored in a memory by using the synchronous signal since this synchronous signal does not represent the position of data on the lower track T-2. In other words, the synchronous signal has no relationship to the data position or signal phase of the lower track T-2. Therefore, in order to correctly pick up the data from the lower track T-2 to correctly store the same into a memory, a complex timing adjusting device may be required, while an extremely large capacity memory is also required. This means that a memory employed in conventional reproduce processors is not large enough, and therefore a high manufacturing cost will be required for providing a reproduce processor capable of processing such digital data simultaneously reproduced from a plurality of tracks having different recording directions.

The present inventors have realized that such conventional problems will be overcome if digital data is recorded on a plurality of tracks of the master tape such that the phase or time difference between tracks recorded in two directions is constant throughout the entire length of the master tape. Namely, the present invention provides apparatus and method for producing a master tape so that the phase relationship between a plurality of tracks is constant throughout the entire length of the master tape even though recording is effected in two directions.

Figure 3:
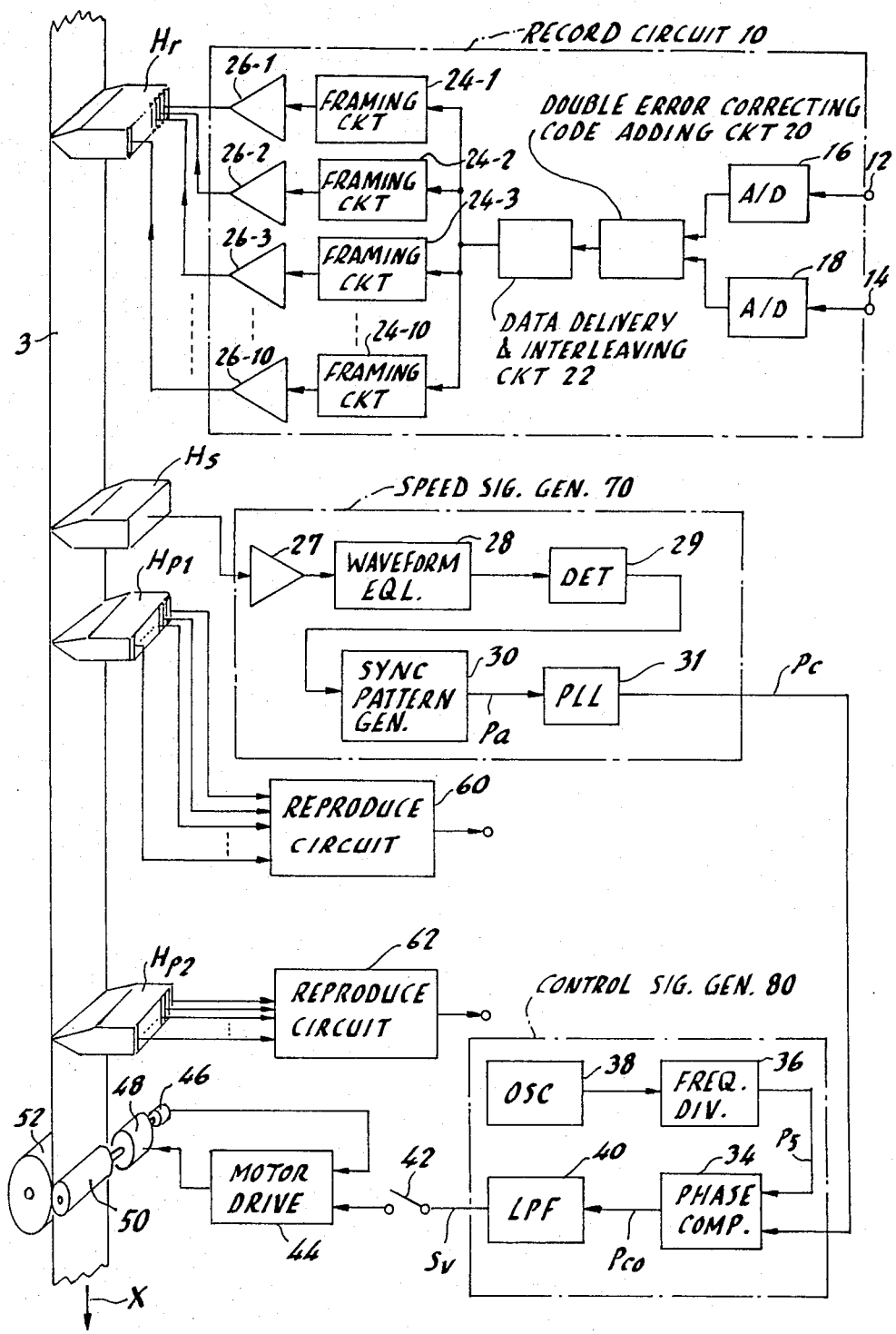
FIG. 3 is a schematic block diagram of an embodiment of an apparatus for producing a master tape according to the present invention.

Reference is now made to FIG. 3, a schematic diagram of an embodiment of the present invention. Although the present invention is directed to apparatus and method for producing a master tape, the embodiment will be described as a master tape recording/reproducing apparatus. An electric motor 48 having a capstan 50 on its shaft is provided to drive a master tape 3 with a pinch roller 52 being biased toward the capstan 50. The motor 48 receives a driving current from a motor drive circuit 44 which controls the rotational speed of the motor 48 by using a signal from tachogenerator 46 operatively connected to the motor 48 and another signal from a switch 42.

The apparatus of FIG. 3 also comprises four magnetic heads Hr, Hs, Hp1 and Hp2. The heads Hr, Hp1 and Hp2 are multi-track heads each having a plurality of magnetic heads aligned in line for scanning a plurality of parallel longitudinal tracks on the master tape 3. Since digital data will be recorded on the master tape 3 in two directions, the track arrangement may be made such that either a first group of a plurality of tracks is made in an upper half part of the master tape 3 and a second group of a plurality of tracks is made in a lower half part of the master tape 3, or the first and second groups of tracks are alternately made. The embodiment illustrated in FIG. 3 is designed to produce first and second groups of tracks which are alternately arranged. Namely, either odd or even tracks are first formed by driving the master tape 3 in one direction, and then even or odd tracks are formed by driving the master tape 3 in an opposite direction. In the case that a recording head Hr is fixed, the master tape 3 may be turned over when the first group tracks have been recorded so as to prepare for forming the second group. In the case that the recording head Hr is movable in a transverse direction of the tape by a distance of one track, the master tape 3 may be driven in an opposite direction without turning over the same for forming the second group of tracks after forming the first group of tracks.

The recording head Hr receives a plurality of recording signals produced in a known recording circuit 10 responsive to an analog signal fed to two input terminals 12 and 14. The recording circuit 10 comprises a pair of analog-to-digital (A/D) converters 16 and 18 which convert the same analog input signals fed from input terminals 12 and 14 respectively. A/D converted signals from the A/D converters 16 and 18 are fed to a double error correcting code adding circuit 20 for adding an error correcting code used to check and correct possible errors which will occur on data transmission. A digital signal from the double error correcting code adding circuit 20 is fed to a data-delivery and interleaving circuit 22 for delivering the digital data to a plurality of additional circuits provided for producing recording signals which drive the recording head Hs to form a plurality of tracks, with the data being interleaved. Each deliverd signal is fed to a framing circuit 24-1 . . . 24-10 for producing a signal having a frame configuration. Each output signal from each framing circuit 24-1 . . . 24-10 is fed via a record amplifier 26-1 . . . 26-10 to a corresponding head winding of the multi-track recording head Hr.

As will be understood from the number of the record amplifiers 24-1 . . . 24-10, the embodiment apparatus is designed to simultaneously form ten tracks at once which are spaced apart by a track width, so that twenty alternate tracks will be formed as a total when odd and even tracks are formed.

Figure 4:
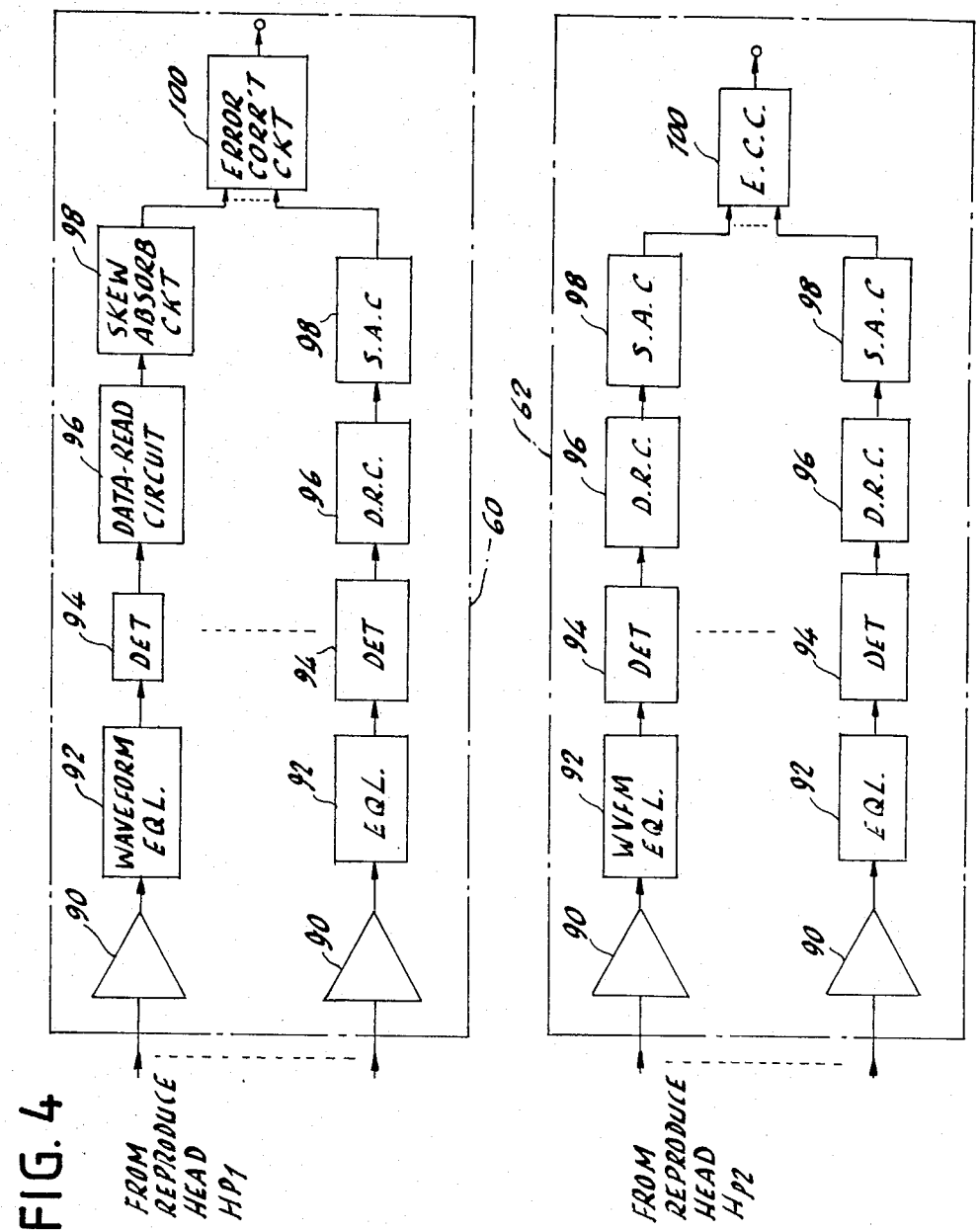
FIG. 4 is a schematic block diagram of a pair of reproduce circuits shown in FIG. 3, which reproduce circuits may be employed so that the apparatus may also be used as a high-speed reproduce apparatus necessary for producing one or more slave copy tapes.

Although two data reproduce heads Hp1 and Hp2 are illustrated because the embodiment is a master tape recording/reproducing apparatus, such reproduce heads Hp1 and Hp2 may be omitted if the apparatus is designed as a master tape recorder only. A first data reproduce head Hp1 picks up data from odd or even tracks, i.e. first or second group tracks, while the second data reproduce head Hp2 picks up data from even or odd tracks. The signals derived from the data reproduce heads Hp1 and Hp2 are respectively processed by known reproduce processing circuits 60 and 62 which are also shown in FIG. 4 in detail. In this embodiment although two data reproduce heads Hp1 and Hp2 are employed since each head has ten magnetic heads, these two heads Hp1 and Hp2 may be replaced with a single multi-track head having twenty magnetic heads for picking up data from all the tracks simultaneously.

In addition to the recording head Hr and the reproduce heads Hp1 and Hp2 another reproduce head Hs is employed for picking up a signal from one of the tracks. This reproduce head Hs has a single head which picks up data from one of first group tracks. Namely, if odd tracks are formed first by the record head Hr, data recorded on one of the odd tracks is derived by the reproduce head Hs when the master tape 3 runs in a direction opposite to that for recording the odd tracks, at the time of forming even tracks.

An output signal from the reproduce head Hs is fed to a tape-speed-indicating signal generating circuit 70, which may be simply referred to as a speed signal generator 70. The speed signal generator 70 comprises an amplifier 27, a waveform equalizer 28, a detector 29, a synchronous pattern generator 30 for decoding a synchronous signal, and a phase-locked loop (PLL) circuit 31. An output signal from the speed signal generator 70 is fed to a control signal generator 80 comprising a phase comparator 34, an oscillator 38, a frequency divider 36, and a low pass filter 40. The control signal generator 80 produces a control signal by comparing the phase between the output signal Pc from the speed singal generator and a predetermined frequency signal Ps, as will be described later in detail, and this control signal will be fed via the switch 42 to the motor driving circuit 44 for the speed control of the motor 48.

Figure 5:
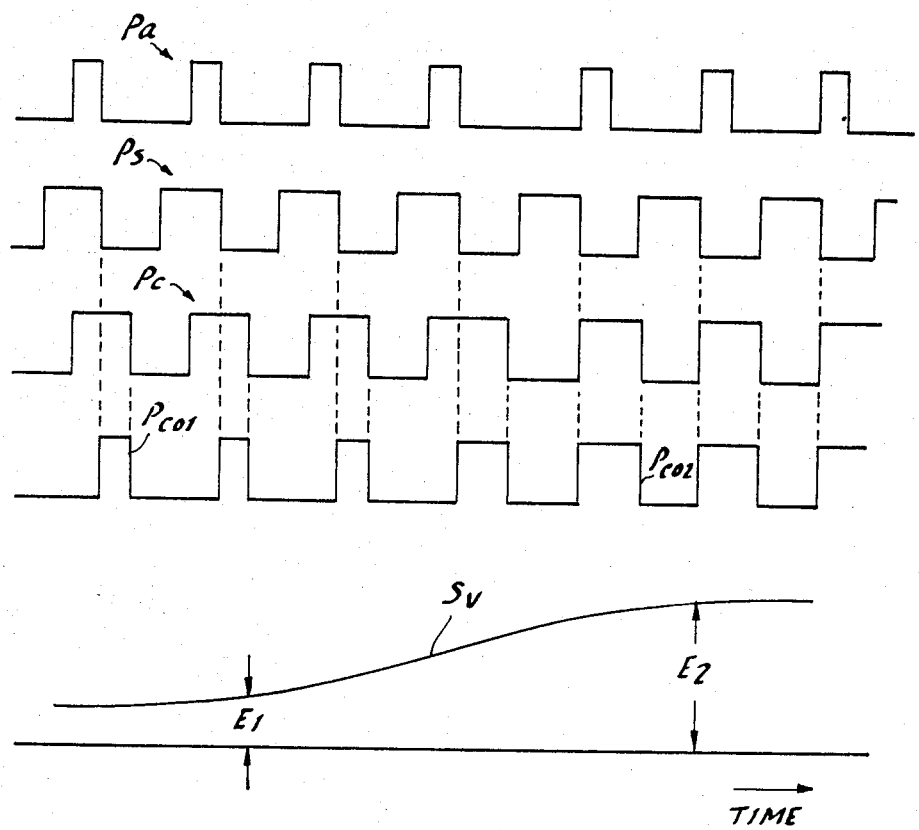
FIG. 5 is a waveform chart useful for understanding the operation of the embodiment of FIG. 3.

The speed signal generator 70 and the control signal generator 80 operate as follows. The output signal from the reproduce head Hs is fed to the amplifier 27 to be amplified, and an amplified signal is then fed to the waveform equalizer 28 so that the waveform of the reproduced signal is equalized. A waveform equalized signal is fed to the detector 29, which may be a voltage comparator, to produce a binary signal. The binary signal is then fed to the synchronous pattern generator 30 which decodes the synchronous signal included in the reproduced signal by distinguishing the same from data signal codes. Namely, in the case of a digital signal having a block or frame configuration as shown in FIG. 2, the synchronous pattern generator 30 produces a pulse signal Pa, as shown in FIG. 5, in response to the synchronous signal interposed between data blocks or frames. The synchronous pattern generator 30 may be formed by a combination of a series-in parallel-out shift register and gate circuits responsive to the output signals from the register. The PLL circuit 31 is responsive to the pulse signal Pa for producing an output signal Pc synchronized with the pulse signal Pa by a voltage-controlled oscillator included in the PLL circuit 31. Output pulse signal Pc is fed to an input terminal of the phase comparator 34 of the control signal generator 80.

The oscillator 38 of the control signal generator 80 is a crystal oscillator oscillating at a predetermined frequency such as 2 KHz. This 2 KHz oscillating signal is frequency divided by the frequency divider 36 for producing a 1 KHz signal Ps for instance. The 1 kHz signal Ps is fed to another input terminal of the phase comparator 34 to be used as a reference signal Ps which is compared with the output signal Pc from the PLL circuit 31 of the speed signal generator 70. The phase comparator 34 compares the phase of the signal Pc and the phase of the reference signal Ps to produce an output pulse signal Pco having a duty cycle proportional to the phase difference between the signal Pc from the PLL circuit 31 and the reference signal Ps from the frequency divider 36. The phase comparator 34 may be actualized by an IC known as 4044 manufactured by Motorola. Since the signal Pc is synchronized with the signal Pa applied to the PLL circuit 31, the phase difference between Pc and Ps equals the phase difference between Pa and Ps. Namely, the phase difference between Pa and Ps is converted into a duty cycle (see output signal pulses Pco1 and Pco2 of FIG. 5). The output pulse signal Pco1, Pco2 . . . is fed to the low pass filter 40 having a cutoff frequency which is much lower than the fundamental frequency of the output signal Pco1, Pco2 . . . from the phase comparator 34. In the case that the fundamental frequency is 1 KHz, the cutoff frequency may be set to 500 Hz or so.

The pulse signal Pco1, Pco2 . . . is smoothed by the low pass filter 40 to be a gradually varying voltage Sv (see voltages $E_1$ and $E_2$), which is used as the control voltage or signal in the motor driving circuit 44. The switch 42 interposed between the low pass filter 40 and the motor driving circuit 44 is turned on either manually or automatically when starting recording on the second group tracks. In other words, when forming the first group of tracks at the beginning, the switch 42 is left open so that the motor driving circuit 44 is responsive to only a speed signal from the tachogenerator 46.

From the above it will be understood that the second group of tracks is formed on the master tape 3 with the tape running speed being controlled by using information indicative of the tape running speed when the first group of tracks was formed. When recording on the master tape 3 in the above manner has been completed, the digital signals recorded on the first and second groups of tracks are such that the phase relationship or phase difference between the first group of tracks and second group of tracks is constant at any point along the tape length.

Figure 6:
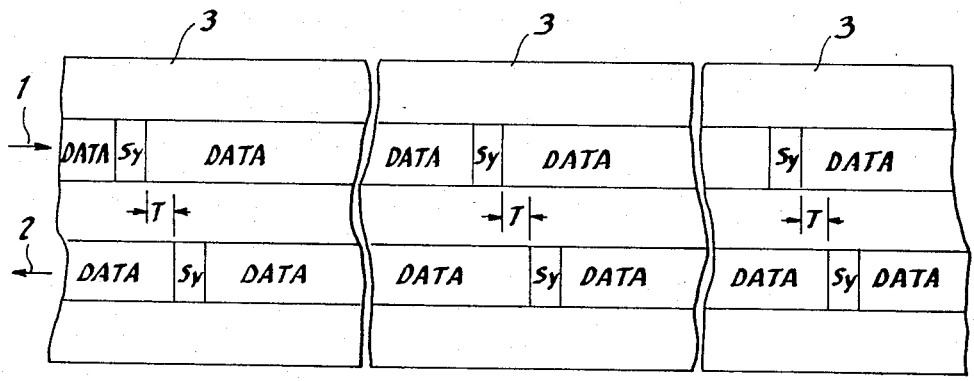
FIG. 6 is a schematic diagram of two tracks on a master tape, which tracks were made by scanning the master tape in opposite directions with the tape speed control according to the present invention.

FIG. 6 is a spatial diagram of the above state of a signal pattern recorded on the master tape 3. As will be understood from a comparison between FIG. 2 and FIG. 6, the phase difference T between the first and second groups of tracks (only one track for each group being shown for simplicity) is contant throughout the entire length of the tape 3.

When recording on the master tape 3 by forming first and second groups of tracks as described in the above, the running speed of the master tape 3 may be set to either a normal tape running speed, such as 4.75 cm/sec in the case of a cassette tape, or to a high speed. However, high speed recording may suffer from dropout of signals, and therefore, it is preferable to record digital signals on the master tape 3 with the tape being driven at a normal speed.

After the master tape 3 has been completed, the recorded digital signals may be copied to one or more slave tapes by reading data from all the tracks simultaneously by way of the data reproduce heads Hp1 and Hp2. At this time the master tape 3 is driven at a high speed so that a number of slave tapes can be produced within a short period of time. An appropriate control voltage may be applied to the motor drive circuit 44 of FIG. 3 to cause the motor 48 to rotate at a high speed. When picking up the recorded digital data from the master tape 3 to copy the same to one or more slave tapes, the running speed of the master tape 3 is also controlled by using the synchronous signal picked up by the reproduce head Hs. Namely, the speed signal generator 70 and the control signal generator 80 are also used in the same manner as in the above on reproduction of the data. With such tape speed control therefore, each data block of each of the tracks can be accurately detected to be processed.

Turning back to FIG. 4, the structure and operation of the reproduce circuits 60 and 62, respectively reponsive to the data reproduce heads Hp1 and Hp2 of FIG. 3, will be described. Since the reproduce circuit 60 is identical to another reproduce circuit 62, only one of them will be described. As shown in FIG. 4, the reproduce cicuit 60 comprises a plurality of identical circuit networks each provided for each track of one of the first and second groups, and an error correction circuit 100 responsive to the plurality of circuit networks. Each of the circuit networks comprises an amplifier 90, a waveform equalizer 92, a detector 94, a data-reading circuit 96, and a skew-absorbing circuit 98. In this embodiment, the number of the above-mentioned circuit networks is ten because each group of tracks includes ten tracks. The output signals from these ten circuit networks are fed to the error correction circuit 100. Since the circuitry of FIG. 4 per se is conventional, further description thereof is omitted. Output signals from the reproduce circuits 60 and 62 may be used to produce slave copy tapes by known recording apparatus.

Figure 7:
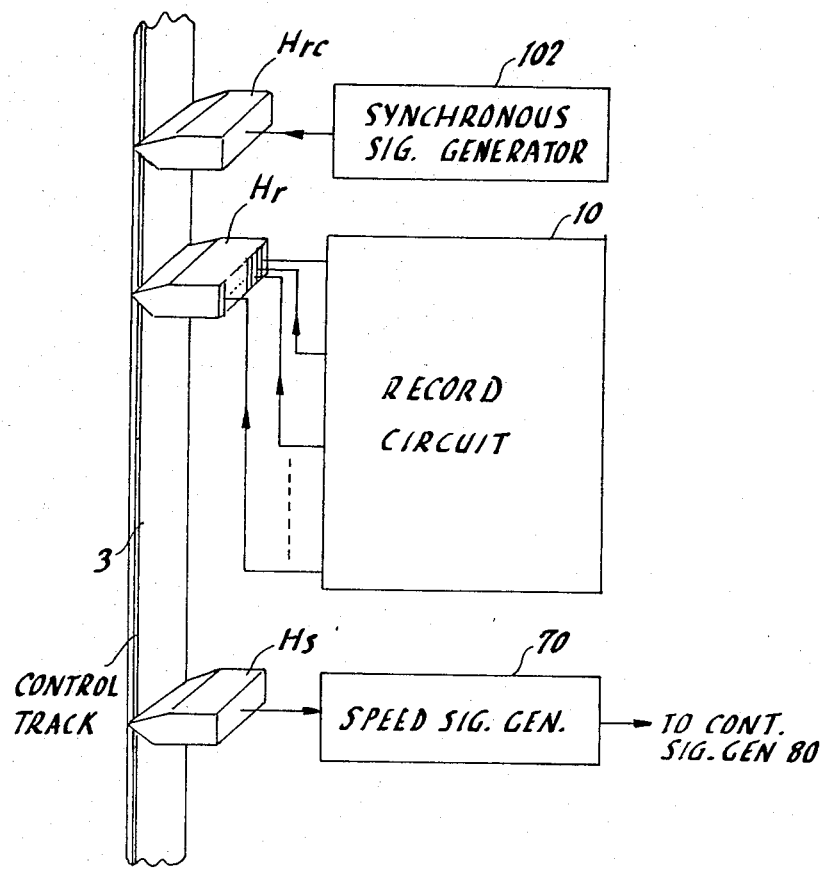
FIG. 7 is a schematic diagram of another embodiment of the present invention in which a control track rather than a data track is used to derive a speed signal.

Reference is now made to FIG. 7 a block diagram of another embodiment of the present invention. This embodiment differs from the embodiment of FIG. 3 in that a synchronous signal is recorded on a control track on the master tape 3, and this synchronous signal is derived by the reproduce head Hs to effect speed control. In order to record a synchronous signal, a recording head Hrc may be additionally provided so that it is driven by a known synchronous signal generator 102. However, if the multi-track record head Hr of FIG. 3 has an unused head, namely, in the case of forming ten data tracks for each group tracks, if the recording head Hr has more than ten heads, the synchronous signal may be recorded via the multi-track recording head Hs to form one or more control tracks. The synchronous signal is recorded at the time that the first group tracks are formed, and is derived by the reproduce head Hs when forming the second group tracks in the same manner as described in the above.

The above-described embodiments are just examples of the present invention, and therefore, it will be apparent for those skilled in the art that many modifications and variations may be made without departing from the spirit of the present invention.

What is claimed is:

1. Apparatus for producing a master tape, comprising:
    (a) tape driving means for driving said master tape;
    (b) a multi-track magnetic head and an associated circuit for recording a digital signal on said master tape such that first and second groups of a plurality of tracks are respectively formed when said multi-track magnetic head scans said master tape in first and second directions;
    (c) a magnetic head for deriving a signal from one of said first group tracks;
    (d) means responsive to said signal from said magnetic head for producing a speed signal indicative of the tape speed at which said digital signal was recorded on said first group tracks in said first direction;
    (e) means for producing a control signal by comparing the phase between said speed signal and a reference signal having a predetermined frequency; and
    (f) means for controlling the speed of said master tape by controlling said means for driving said master tape, by using the result of the comparison, when forming said second group tracks.

2. Apparatus as claimed in claim 1, wherein the speed signal producing means comprises a magnetic reproduce head arranged to scan at least one of said first group tracks, on which said digital signal was recorded in said first direction, when recording another digital signal by forming said second group tracks, and circuitry responsive to an output signal from said reproduce head.

3. Apparatus as claimed in claim 2, wherein said circuitry comprises:
    (a) an amplifier responsive to said signal from said reproduce head;
    (b) a waveform equalizer responsive to an output signal from said amplifier;
    (c) a detector responsive to an output signal from said waveform equalizer for producing a binary signal;
    (d) a synchronous pattern generator responsive to said binary signal for producing an output pulse signal in response to a predetermined code of a synchronous signal; and
    (e) a phase-locked loop circuit responsive to said output pulse signal from said synchronous pattern generator for producing a pulse train signal in synchronism with said output pulse signal.

4. Apparatus as claimed in claim 1, wherein said control signal producing means comprises:
    (a) circuitry for producing said reference signal; and
    (b) a phase comparator for producing an output pulse signal having a duty cycle proportional to the phase difference between said speed signal and said reference signal.

5. Apparatus as claimed in claim 4, wherein the reference signal producing means comprises an oscillator and a frequency divider responsive to said oscillator.

6. Apparatus as claimed in claim 4, further comprising a low pass filter responsive to said output signal from said phase comparator.

7. Apparatus as claimed in claim 1, further comprising a switch provided between the control signal producing means and the speed controlling means so that said control signal is used only when said second group tracks are formed.

8. Apparatus as claimed in claim 1, further comprising a data reproduce multi-track head arranged to scan said first and second group tracks simultaneously for deriving data therefrom, and an associated reproduce circuit.

9. Apparatus as claimed in claim 1, further comprising first and second data reproduce multi-track heads arranged to respectively scan said first and second group tracks simultaneously for deriving data therefrom, and associated reproduce circuits.

10. Apparatus for producing a master tape, comprising:
  (a) tape driving means for driving said master tape;
  (b) a multi-track magnetic head and an associated circuit for recording a digital signal on said master tape such that first and second groups of a plurality of tracks are respectively formed when said multi-track magnetic head scans said master tape in first and second directions;
  (c) means for forming a control track when forming said first group tracks by recording a predetermined synchronous signal;
  (d) a magnetic head for deriving said synchronous signal from said control track when forming said second group tracks;
  (e) means responsive to said synchronous signal from said magnetic head for producing a speed signal indicative of the tape speed at which said digital signal was recorded on said first group tracks in said first direction;
  (f) means for producing a control signal by comparing the phase between said speed signal and a reference signal having a predetermined frequency; and
  (g) means for controlling the speed of said master tape by controlling said means for driving said master tape, by using the result of the comparison, when forming said second group tracks.

11. A method for producing a master tape, comprising the steps of:
  (a) recording a digital signal on said master tape by making a first group of a plurality of tracks;
  (b) deriving a signal from a track of said first group of tracks for producing a signal indicative of the speed of said master tape at which said digital signal was recorded on said first group tracks;
  (c) producing a control signal by using said signal indicative of said speed and a signal having a predetermined frequency;
  (d) controlling the tape driving speed on the basis of said control signal; and
  (e) recording another digital signal on said master tape by making a second group of a plurality of tracks by driving said master tape in a direction opposite to that used for making said first group tracks, with the tape speed being controlled.

12. A method for producing a master tape, comprising the steps of:
  (a) recording a digital signal and a synchronous signal on said master tape by making a first group of a plurality of tracks for said digital signal and a control track for said synchronous signal;
  (b) deriving said synchronous signal from said control track for producing a signal indicative of the speed of said master tape at which said digital signal was recorded on said first group tracks;
  (c) producing a control signal by using said signal indicative of said speed and a signal having a predetermined frequency;
  (d) controlling the tape driving speed on the basis of said control signal; and
  (e) recording another digital signal on said master tape by making a second group of a plurality of tracks by driving said master tape in a direction opposite to that used for making said first group tracks, with the tape speed being controlled.

* * * * *